No. 752,079. PATENTED FEB. 16, 1904.
J. W. LAFFERTY.
FIELD LEVELER.
APPLICATION FILED AUG. 12, 1903.
NO MODEL.
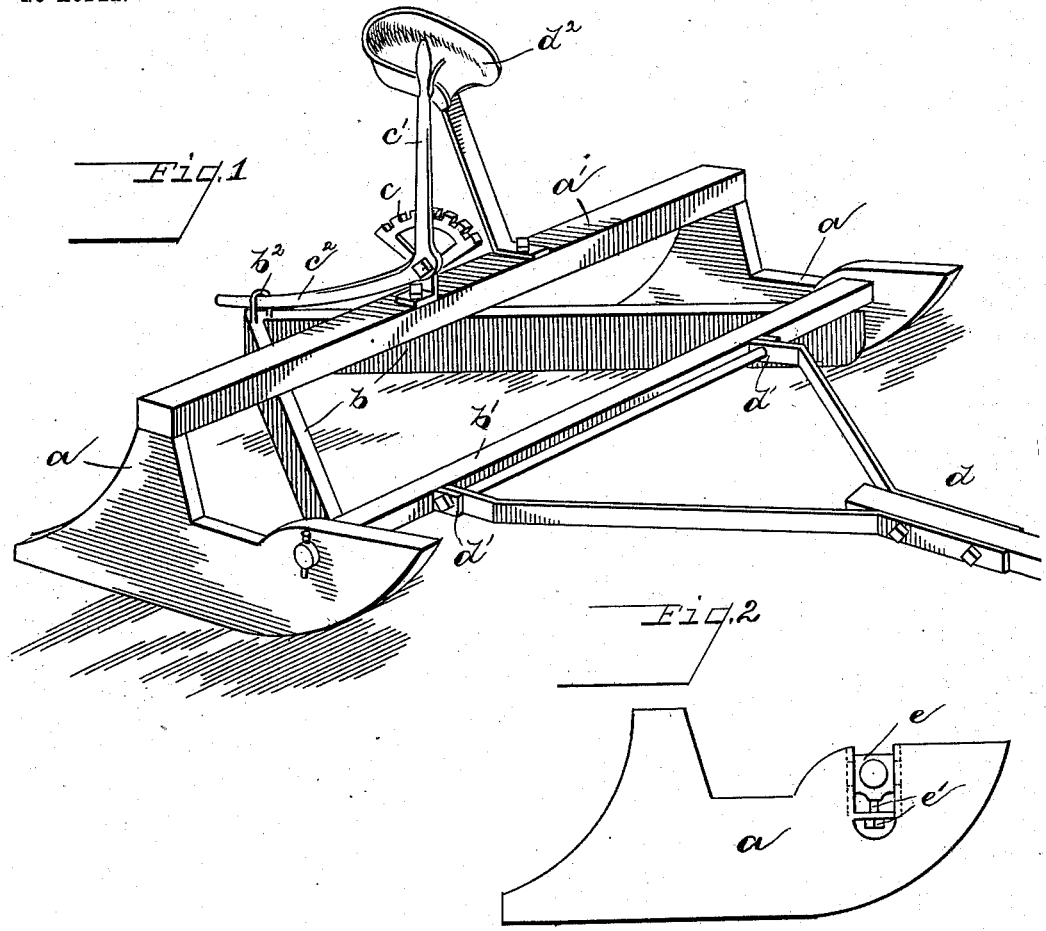

No. 752,079. Patented February 16, 1904.

UNITED STATES PATENT OFFICE.

JACOB W. LAFFERTY, OF NEAR MECHANICSBURG, OHIO.

FIELD-LEVELER.

SPECIFICATION forming part of Letters Patent No. 752,079, dated February 16, 1904.

Application filed August 12, 1903. Serial No. 169,169. (No model.)

*To all whom it may concern:*

Be it known that I, JACOB W. LAFFERTY, a citizen of the United States, residing near Mechanicsburg, in the county of Champaign and State of Ohio, have invented certain new and useful Improvements in Field-Levelers, of which the following is a specification.

My invention relates to a field-leveler, and more particularly to a device for returning to the furrows the soil thrown up by a disk harrow or grain-drill, so as to leave the surface of the ground level, and the device may be employed for the purpose named whenever a series of furrows have been made by any means or the surface of the ground broken up.

Farming, like other commercial enterprises, has reached such a stage that it requires the most careful methods to realize a profit, and it has been found that it is not only necessary to thoroughly prepare the ground for seeding, but that very much better yields are obtained by leveling the surface of the ground. When the furrows are left open, water will gather, freeze, and thaw and damage the grain.

For the purpose of equalizing the draft disk harrows and drills are made with two series of disks, so disposed that in opening the furrows the soil is turned upwardly and outwardly from the longitudinal center of the machine toward the respective sides thereof.

The object of my invention is to provide a leveler so formed as to draw from its respective sides toward the center, and thereby move the soil back into the respective furrows from which it has been turned by the disks.

A further object is to provide means whereby the leveler may be adjusted in its operative relations to the ground to meet varied conditions of the soil.

With these and other objects in view, as will more fully appear, my invention consists of the constructions and combinations hereinafter described, and set forth in the claims.

In the accompanying drawings, which form a part of this specification, Figure 1 is a perspective view of a machine embodying my invention, and Fig. 2 is a detail showing an adjustable journal-box for the leveler.

Like parts are represented by similar characters of reference in the several views.

The device may be supported by carrying-wheels; but I preferably employ runners $a$, as shown in the drawings, as they give greater bearing-surface on the ground, and thereby afford greater accuracy in the operation of the leveler. A cross-beam $a'$ is rigidly secured to the runners $a$ and forms with said runners the main frame or support for the leveler $b$, which is preferably shaped as hereinafter described and rigidly secured at its forward end to a cross-bar $b'$, said bar being journaled at its respective ends in the runners $a$, as shown. The leveler is journaled in the runners so that normally its lower edge terminates substantially with the bottom of the runners. On a bracket $c$, secured to the cross-beam, I pivot a hand-lever $c'$, having a rearwardly-extending arm $c^2$, adapted to extend through a loop or staple $b^2$ on the rear end of a leveler, by which said end is raised and lowered to adjust the leveler to the condition of the soil. In hard ground the leveler is depressed, while in mellow ground it can be adjusted to move the upturned soil into the furrows without it being accumulated and carried forward by the leveler. The bracket $c$ is provided with cogs, as shown, and the hand-lever with a spring-pressed slide to engage said cogs in a well-known manner, so that the leveler will be held in the position to which it has been adjusted by the hand-lever.

The machine may be attached to a harrow or drill and travel with the same or it may be used separately. I have shown a tongue or pole $d$ pivoted to the cross-bar at $d'$, said pivoted connection permitting the raising and lowering of the leveler, as hereinbefore described. A seat $d^2$ is also shown secured to the cross-beam.

The leveler I have shown V-shaped in form, with its apex or closed end extending rearwardly and with the sides preferably at right angles to each other; but the sides may be placed at any angle which will move the upturned soil from the respective sides toward the center of the machine, or they might be formed of a U shape.

In addition to its merits as a leveler I have found by actual experience in the field the device is peculiarly well adapted to draw the weeds to the surface of the ground and free them from dirt, thus leaving them to wither and die.

In Fig. 2 I have shown a movable journal-box $e$, adjusted by a screw $e'$. Said boxes can be mounted in each of the runners and the respective ends of the cross-bar journaled therein. By this arrangement the forward ends of the leveler can be adjusted to compensate for wear on the runners or for other purposes.

Having thus described my invention, I claim—

1. In a machine such as described, the combination with the supporting-frame, of runners and a triangle leveler with one side open pivotally connected to said runners, the apex of said triangle at or near the rear of said runners, and its open side at the front thereof, and adapted to level the dirt to the longitudinal center of the machine.

2. In a machine such as described, the combination with a supporting-frame having movable journal-boxes therein and means to adjust the same, of a V-shaped leveler having its open ends pivoted in said boxes with its closed ends extending rearwardly, substantially as specified.

3. In a machine such as described, the combination with a supporting-frame having movable journal-boxes therein and means to adjust the same, of a V-shaped leveler having its open ends pivoted in said boxes with its closed ends extending rearwardly, and means to raise and lower the rear end of said leveler to adjust it in its relation to the surface of the ground, substantially as specified.

4. In a machine such as described, the combination with a pair of runners and a cross-beam forming with said runners a supporting-frame, of a cross-bar pivoted to said runners and a V-shaped leveler having its open ends rigidly secured to said bar and with its closed ends extending rearwardly.

5. In a machine such as described, the combination with a pair of runners and a cross-beam forming with said runners a supporting-frame, movable journal-boxes in said runners and means to adjust the same, of a cross-bar journaled in said boxes and a V-shaped leveler having its open ends rigidly secured to said bar with its closed ends extending rearwardly, and a lever pivoted on said cross-beam and adapted to engage said leveler to depress and raise its rear end to adjust said leveler in its relation to the surface of the ground, substantially as specified.

In testimony whereof I have hereunto set my hand this 5th day of August, A. D. 1903.

JACOB W. LAFFERTY.

Witnesses:
J. B. HUNT,
CHAS. A. WOOD.